(12) United States Patent
Tavernier (10) Patent No.: US 11,378,155 B2
(45) Date of Patent: Jul. 5, 2022

(54) JUNCTION DEVICE FOR CONVEYOR BELTS

(71) Applicant: FP BUSINESS INVEST, Saint-Chamond (FR)

(72) Inventor: Bernard Tavernier, Saint-Chamond (FR)

(73) Assignee: FP BUSINESS INVEST, Saint-Chamond (FR)

( * ) Notice: Subject to any disclaimer, the term of this patent is extended or adjusted under 35 U.S.C. 154(b) by 0 days.

(21) Appl. No.: 16/975,023

(22) PCT Filed: Feb. 22, 2019

(86) PCT No.: PCT/FR2019/050406
§ 371 (c)(1),
(2) Date: Jun. 29, 2021

(87) PCT Pub. No.: WO2019/162628
PCT Pub. Date: Aug. 29, 2019

(65) Prior Publication Data
US 2021/0054906 A1    Feb. 25, 2021

(30) Foreign Application Priority Data

Feb. 22, 2018  (FR) ...................................... 1851530

(51) Int. Cl.
*F16G 3/08*    (2006.01)
(52) U.S. Cl.
CPC ...................................... *F16G 3/08* (2013.01)
(58) Field of Classification Search
None
See application file for complete search history.

(56) References Cited

U.S. PATENT DOCUMENTS 590,356 A  *  9/1897  Boucher .................. F16G 3/08
                                                    24/31 B
752,512 A       2/1904  Buckley
(Continued)

FOREIGN PATENT DOCUMENTS

DE    1910648 A1    9/1970
EP    0827575 B1    3/1998
(Continued)

OTHER PUBLICATIONS

International Search Report dated May 7, 2019 for corresponding International Patent Application No. PCT/FR2019/050406.
(Continued)

*Primary Examiner* — William R Harp
(74) *Attorney, Agent, or Firm* — Hauptman Ham, LLP (57) ABSTRACT

A junction plate for a junction device of conveyor belt intended to connect two ends of at least one conveyor belt. The junction device is of a type having at least two junction plates fastened together with the ends of the conveyor belt by fasteners each including a head and an anchoring section. The junction plate includes first interfaces to cooperate with the heads of the fasteners and second interfaces to cooperate with the anchoring sections of the fasteners. The second interfaces are distinct from the first interfaces and include inserts incorporated at least in part in the junction plate. The first and second interfaces are arranged so as to form a succession of patterns which are repeated, and each pattern has as many first interfaces as second interfaces.

10 Claims, 4 Drawing Sheets

(56) References Cited

U.S. PATENT DOCUMENTS 5,839,571 A 11/1998 Jakob
6,601,698 B2 8/2003 Jakob

FOREIGN PATENT DOCUMENTS

| EP | 1163459 A1 | 12/2001 |
| WO | 97/26466 A1 | 7/1997 |
| WO | 01/53715 A1 | 7/2001 |
| WO | 2014/128042 A1 | 8/2014 |

OTHER PUBLICATIONS

Written Opinion issued for corresponding International Parent Application No. PCT/FR2019/050406 dated May 7, 2019.

* cited by examiner

Fig. 1  PRIOR ART

SECTION A-A
Fig. 2  PRIOR ART

JUNCTION DEVICE FOR CONVEYOR BELTS

CROSS REFERENCE TO RELATED APPLICATION

This present application is a national stage filing under 35 U.S.C § 371 of PCT application number PCT/FR2019/050406 filed on Feb. 22, 2019 which is based upon and claims the benefit of priorities to French Patent Application No. 18/51530 filed on Feb. 22, 2018 in the French Patent Office, which are incorporated herein in their entireties by reference.

FIELD

The present invention relates to a junction device for conveyor belts intended to connect the ends of a conveyor belt. In an aim of simplification, the term conveyor belt will have, by convention, in the present description, not just the sense of conveyor belt but also that of drive belt.

BACKGROUND

Conveyor belts, also called band conveyors, used to transport different materials or different products, such as coal, ore, industrial or farming products are known. These conveyor belts consist of belts made of a reinforced elastomer, or made of a reinforced synthetic material, of an appropriate length and width, of which the ends must be connected together, before mounting, or after mounting, on support and drive devices comprising return rollers and idler rollers. Often these devices also comprise tensioning members, having the aim of correctly tensioning the conveyor belt.

Until now different means have been used to make this link of the ends of conveyor belts. Originally, and still today, vulcanisation is used when the belt is constituted of a reinforced vulcanisable elastomer. After preparation work intended to create in each end complementary profiles which apply on each other when said ends are brought together, the vulcanisation is carried out with input of heat and pressure as is well known. An alternative to vulcanisation is cold bonding.

Another known linking means consists in the fact of using clips of general U shape, cut from a metal sheet, which clips comprise upper plates and lower plates connected by knuckles, these clips being fastened in two series straddling each of the ends of the conveyor belt to connect, in such a way that the knuckles jut out and that those of a series can be interleaved between the knuckles of the other series, a linking and hinging rod next being passed inside the interleaved knuckles in such a way as to connect thereby the two ends while forming a sort of hinge. Known means used to fasten the clips on the ends of conveyor belt consist in stem fastening means such as crampons, rivets and screws.

In a more recent past junction devices have been proposed resorting to flat linking elements generally made of reinforced elastomer or reinforced synthetic material, arranged respectively on one side and on the other side of the conveyor belt ends and fastened on said ends that it involves connecting. Examples of such junction devices are given in the patents EP-0827575-B1 and EP-1163459-B1.

These devices comprise an upper plate and a lower plate, optionally connected by a central part. These lower and upper plates have a spacing suited to engaging therein the respective end of a conveyor belt, by making them come approximately in abutment against the central part, or instead in the case where the junction device does not have a central part, against a spacer provided for this purpose during mounting, then removed later.

In other words, these junction devices comprise two pairs of opposite fastening wings, the ends of the conveyor belt being introduced respectively between two wings of a same pair.

The fastening of the lower and upper parts forming junction plate on the ends of the conveyor belt generally takes place by means of rivets, spikes, crampons, screw-nut systems, or instead by cold bonding or by flat vulcanisation of the wings against the outer flat surfaces of the conveyor belt engaged between the wings. These junction devices are made of a flexible and elastic material, for example made of vulcanised rubber, or made of a synthetic material such as polyurethane and they generally comprise an incorporated reinforcement.

The junctioning devices proposed are generally made of a flexible and elastic material in which is embedded a reinforcement, for example textile, having an extensibility in the longitudinal sense.

The longitudinal sense is by convention and for the convenience and the clarity of the disclosure throughout the present description the longitudinal sense of the conveyor belt, and also applies to the considered operating device such as it has to be mounted on the conveyor belt. The transversal sense is the sense perpendicular to the longitudinal sense thus defined, whatever the dimensions of the junctioning device considered in isolation.

This extensibility of reinforcements of this type of junctioning devices in the longitudinal sense has the aim of enabling operating devices mounted on conveyor belts to cross in a repeated manner, without excessive wear or fatigue, leading to rapid deterioration, the curved parts on the route of the conveyor belts, namely the passage on the drive rollers, the return rollers and the tensioning rollers. Indeed, during this operation the upper part of the junctioning devices undergoes a tractive force whereas their lower part (that is to say that oriented towards the outer surface of the rollers) undergoes a compressive force, and, on account of the difference in the route of these parts, these routes being directly proportional to the radius of curvature, which varies on account of the thickness of the junctioning devices. These stresses being clearly different between the lower and upper parts, and in order to further improve the wear resistance of these junctioning devices, it is known to confer on the upper part greater extensibility than that of the lower part.

In this type of conveyor belt junction, the central part has next evolved so as to be disengaged from the lower and upper plates, and does so to leave room for the use of independent spacers used at the moment of mounting against which abut the first of the ends of the conveyor belt which is put in place in the junction, between the lower and upper plates, then these spacers are removed before putting in place the second of the ends of the conveyor belt.

Indeed, junction devices were produced by moulding or by injection and had a "H" shaped structure of which the lower and upper plates and the central part were formed of a single piece. This required for their manufacture as many moulds as thicknesses of conveyor belts encountered in the field, and had to be manufactured, hence, in very small series, which increased the cost price, the manufacturing price, the storage price and the distribution price.

This problem, namely that of the multiplicity of moulds and moulded products having to cope with the varied thicknesses of conveyor belts, has been resolved notably by producing, as described above, junction devices in three distinct parts: a part constituting upper left and right wings forming a single piece, a part constituting lower left and right wings forming a single piece, and an intermediate part, corresponding to the median bar of the "H" shaped profile, this intermediate part forming spacer.

In such a configuration, it becomes possible to manufacture the two lower and upper plates in isolation and each is configured so as to be suited to the forces that they undergo (compressive/tractive forces) and the associated stresses.

For example, the lower plate is laid out to undergo without damage the passage on drive or return rollers, driving or returning the conveyor belt at the ends of which is mounted the considered junction device, the lower plate coming directly into contact with these members for driving the belt.

The upper plate is for its part directly in contact with the different materials or different products transported on the conveyor belt. Furthermore, the upper plate is also generally swept by scrapers.

SUMMARY

The aim of the present invention is to propose a solution which corresponds to an evolution of this type of existing junction and which makes it possible to further guarantee a reduction in costs to decrease the cost price, manufacturing price, storage price and distribution price, this obviously without adversely affecting in any way the quality of the product obtained, that is to say while conserving, or even while improving, the quality and the strength of the junction device and while guaranteeing the excellence of these fastening means.

For this purpose, the invention relates to a junction plate for a junction device of conveyor belt intended to connect two ends of a conveyor belt, the junction device being of the type comprising at least two junction plates fastened together with the ends of the conveyor belt by fastening means each comprising a head and an anchoring section, for example an anchoring end opposite to the head, the junction plate being remarkable in that it comprises first interfaces to cooperate with the heads of the fastening means and second interfaces to cooperate with the anchoring sections of the fastening means, the second interfaces being distinct from the first interfaces and comprising inserts incorporated at least in part in the junction plate, the first and second interfaces being arranged so as to form a succession of patterns which are repeated, and in that each pattern has as many first interface(s) as second interface(s).

The invention also relates to an alternative, optionally complementary, solution, namely a junction plate for a junction device of conveyor belt intended to connect two ends of a conveyor belt, the junction device being of the type comprising at least two junction plates fastened together with the ends of the conveyor belt by fastening means each comprising a head and an anchoring section provided with a threading, the junction plate being remarkable in that it comprises first interfaces to cooperate with the heads of the fastening means and second interfaces to cooperate with the anchoring sections of the fastening means, the first and second interfaces being arranged so as to form a succession of patterns which are repeated, and in that each pattern has as many first interface(s) as second interface(s).

Such a junction plate, according to one or the other of these alternatives, notably has the advantage of being able to be used both as upper junction plate and as lower junction plate. In this way, it becomes possible to manufacture a single type of junction plate and no longer two different junction plates, each having, in the prior art, a same type of fastening interface.

The term "interface" is taken to mean an element or a means that is configured to make it possible to establish a cooperation between two elements.

Moreover, the junction plates are generally cut from a continuous belt or portion of belt of several successive junction plates. In such a configuration, it is thus possible to manufacture a lower junction plate and a corresponding upper junction plate from the same belt or portion of belt of junction plates, this despite the fact that the first and second interfaces are distinct.

Furthermore, and contrary to the prejudices of those skilled in the art, a configuration where each of the junction plates has first and second interfaces does not hinder maintenance. Indeed, in the prior art, the fastening means were all oriented in a same direction, the head accessible from the upper side of the belt, and this was so to facilitate access thereto. Within the scope of the invention, it turns out that in a position where the ends of the conveyor belt are not situated at the level of the drive rollers, return rollers or tensioning rollers, it is possible to have access to the two sides, lower and upper, of the conveyor belt which enables access to any maintenance operation.

Furthermore, and again contrary to the prejudices of those skilled in the art, it could be expected that the integration of the second interfaces on the upper junction plate can see its elasticity decreased, the tapped inserts having a greater bulk in the junction plate itself. Tests have made it possible to show that this was not the case and that this did not have any significant impact on the extensibility of the junction plates, and even less on that of the reinforcements.

In a particular configuration, a pattern comprises a first and a second sub-pattern, the second pattern being complementary to the first pattern, and the first and second interfaces being arranged so as to form an alternating succession of a first and a second sub-pattern which are repeated alternately and successively.

In such a configuration, a junction plate is capable of being superimposed with another junction plate having the same characteristics in order to be able to mate with each other and form, together, a junction device.

In a complementary and/or alternative configuration, a junction plate comprises first and second opposite wings, configured to each cover a distinct end of the conveyor belt on a same side, each of said wings comprising a sub-pattern defined by an arrangement of the first and/or second interfaces, the sub-pattern of one of these wings being complementary to the sub-pattern of the others of these wings. The term "complementary" is taken to mean that the arrangements of the interfaces each defining two sub-patterns are symmetrical with respect to a median axis of the junction plate separating said wings but that the position of a first interface on a wing corresponds to the position of a second interface on the other wing.

Preferably, the first wing uniquely comprises first interfaces and the second wing uniquely comprising second interfaces. This is particularly advantageous given that this greatly simplifies the installation of the junction plate by an operator since by fastening the junction plate to one end of the conveyor belt the fastening means have a similar orientation for a given wing and the operator is thus not obliged to change orientation to put in place these fastening means on said wing.

Preferably, the first and/or the second interfaces comprise inserts, the inserts being incorporated at least in part in the junction plates.

In an advantageous configuration, the first interfaces comprise added parts, that is to say that they are not incorporated in the junction plate, and the second interfaces comprise inserts incorporated at least in part in the junction plate.

In this case, the added parts are laid out to provide a complement and/or reinforcement of an interface zone of the junction plate forming first interface, such as an orifice suited to being traversed by the fastening means.

According to a technical configuration, the first interfaces comprise pierced washers comprising a cup capable of housing a head of the fastening means. In such a configuration, the washers forming first interfaces thus form added parts associating around and as a complement to an orifice of the junction plate suited to being traversed by the fastening means. Alternatively, or instead in combination in the case where first different interfaces are integrated together with a same junction plate, these washers may also be incorporated in the junction plate, that is to say embedded in the flexible and elastic material such as for example the vulcanised rubber forming the junction plate.

Advantageously, the second interfaces comprise a cylindrical tubular part of which an inner cylindrical surface is capable of cooperating with an anchoring section of the fastening means.

According to another aspect, the invention also relates to a junction device for conveyor belt, intended to connect two ends of the conveyor belt, the junction device comprising at least two junction plates configured to each cover a distinct side of the ends of the conveyor belt so that said conveyor belt is arranged between the two junction plates, the junction plates being fastened together by fastening means laid out to traverse respectively a junction plate, one of the ends of the conveyor belt then the other junction plate, the fastening means each comprising a head and an anchoring section, for example an anchoring end opposite to the head, the junction plates comprising first interfaces to cooperate with the heads of the fastening means and second interfaces to cooperate with the anchoring sections of the fastening means, the junction device being remarkable in that the junction plates have all or part of the aforesaid characteristics and in that they are laid out to mate with each other.

Such a junction device enables a reduction in costs to decrease the cost price, manufacturing price, storage price and distribution price given that the junction plates that compose it are manufactured according to the same pattern while being complementary in order to enable the junction of the ends of the conveyor belt.

According to a particular technical configuration, each of the junction plates comprises as many first interfaces as second interfaces.

According to an exemplary embodiment, the junction plates are identical.

According to a configuration, the patterns of the two junction plates are offset by a predetermined pitch.

Advantageously, each of the junction plates comprises first and second opposite wings configured to each cover a distinct end of the conveyor belt of a same side, the first wing uniquely comprising first interfaces and the second wing uniquely comprising second interfaces. This makes it possible to simplify the putting in place of the junction device during its fastening to the ends of the conveyor belt given that the fastening means, for a given end of the conveyor belt, are then oriented in the same manner since the vertical alignment of the first and second interfaces determines the orientation of the corresponding fastening means.

In this configuration, each of the two wings of the junction plate has a same type of interface, first or second interfaces. This is particularly advantageous in terms of manufacturing the junction plate. Indeed, said junction plate being preferably manufactured in a continuous manner, it is possible to arrange in a same manufacturing zone, on one side a tooling which could put in place the first interfaces on one of the two wings, and, on the other side another tooling which could put in place the second interfaces on one of the two wings. This operation may also be carried out manually, by two persons concomitantly. During production, the manufacturing line is thus particularly optimised and the manufacturing time decreased since the two operations may be carried out concomitantly and not successively.

According to a particular configuration, the fastening means comprise screws having a head and an anchoring section provided with a threading.

According to another aspect, the invention also relates to a method for manufacturing a junction plate having all or part of the aforesaid characteristics, remarkable in that it comprises at least the following steps:

manufacturing a continuous succession of junction plates in the form of belt; and cutting, from said belt thus manufactured, junction plates according to predetermined dimensions.

Such a manufacturing method is particularly advantageous in that it enables continuous manufacture of several successive junction plates. The lower and upper junction plates are then cut from the same belt or portion of belt thus manufactured.

BRIEF DESCRIPTION OF THE DRAWINGS

Other characteristics and advantages of the invention will become clear from reading the description that follows, given uniquely as an example, with reference to the appended figures, which illustrate.

In all of these figures, identical or analogous references designate identical or analogous members or sets of members.

DESCRIPTION

Figure 1:
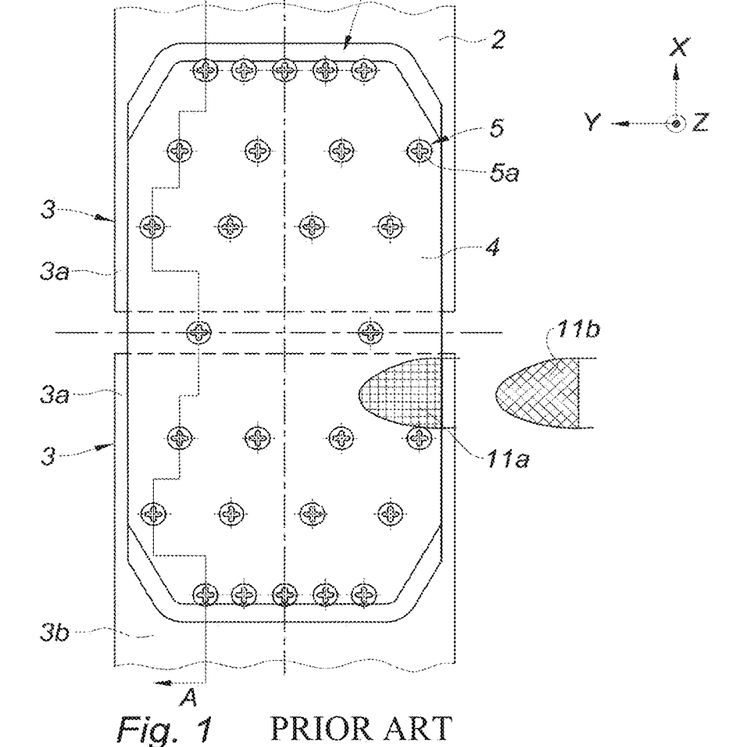
FIG. 1, a planar view of a junction device of the prior art, seen from above.

FIG. 1, which is a planar view, seen from above, of a junction device 1 according to the prior art and shows an upper junction plate 4 of a junction device 1.

The heads 5a of the screws 5 which constitute an example of means for assembling junction devices may also be noticed.

The cutaways 11a and 11b show two types of reinforcements of textile type, which are woven: in the reinforcement 11a the fabric is arranged in such a way that its weft threads, or instead its warp threads, are oriented at least approximately in the longitudinal sense of the junction device 1.

It is recalled that by convention the longitudinal sense X of the junction device 1 corresponds, in the present description, to the longitudinal sense X of the conveyor belt 2, the junction device 1 being mounted on the ends 3 of the conveyor belt 2 that connects it. The transversal sense Y of the junction device 1 is, according to the same convention, the sense perpendicular to the longitudinal sense X. This convention is applied whatever the actual dimensions of the junction device 1 in these two directions.

The junction device of FIG. 1 is composed of three elements: an element forming upper junction plate 4, an intermediate element 9 situated under the median part of the junction plate 4 which is not visible in FIG. 1 other than by the two dotted lines situated on either side of the two median screws 5 delimiting under the upper junction plate 4 the edges of the ends of the conveyor belt 2 to connect, and an element forming lower junction plate 4, not visible in FIG. 1, which is situated under the intermediate element 9 and under the element forming upper junction plate 4.

Figure 2:
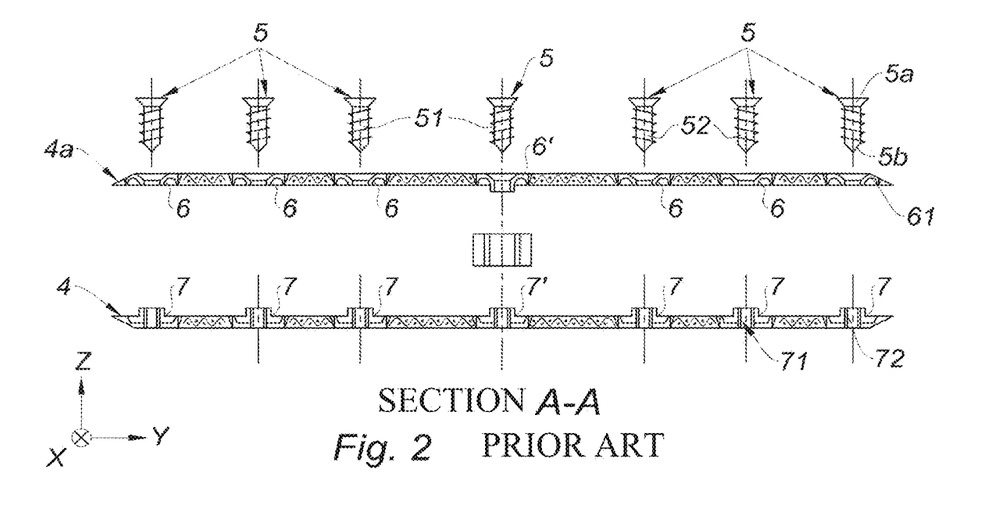
FIG. 2, a longitudinal sectional view along the section A-A of FIG. 1 of a junction device, representing in exploded view the different constituent elements.

The exploded section of FIG. 2 shows successively:
assembly screws 51 forming fastening means 5,
the upper junction plate 4a,
inserts 6 incorporated in the upper junction plate 4,
the intermediate element 9 comprising an incorporated through socket, arranged vertically along a vertical axis Z,
the lower plate 3 comprising tapped inserts 7.

The inserts 6 laid out to receive the heads 5a of screws 51 being in a general manner in the form of pierced washers 61 comprising a cup capable of housing the heads 5a of the screws 5 intended to pass into the hole of the pierced washers. The central insert 6' being in a general manner like the inserts 6 but it comprises a central tubular part, of which the inner cylindrical surface is capable of allowing the passage, with a very small clearance, of the corresponding screw 5, this screw thus not being screwed into the insert 6'. The central tubular part of the insert 6' juts out from the lower surface of the upper junction plate 4.

The inserts 7 each comprise a central tubular part of which the inner cylindrical surface is tapped and is capable of receiving a screw 51 screwed into the tapping, said central tubular parts jutting out from the upper surface of the lower junction plate 4 of the junction device 1. The median inserts 7' of the lower plate being like the inserts 7.

Figure 3A:
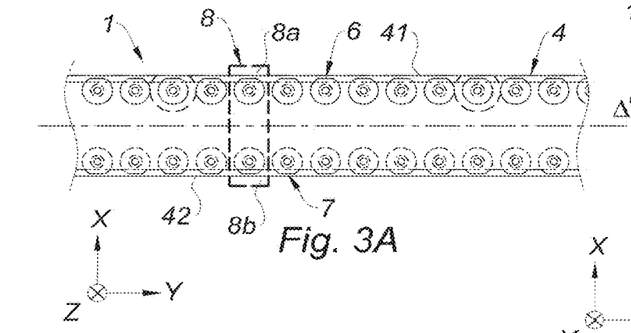
FIG. 3A, a planar view of a junction device according to an embodiment of the invention, seen from above.
Figure 3B:
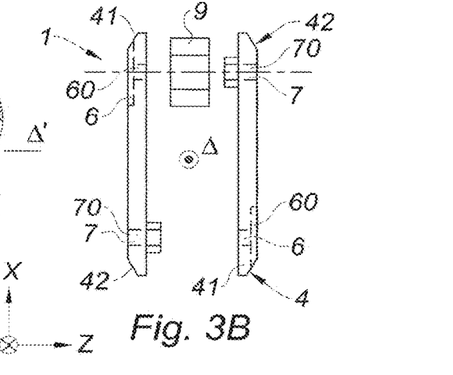
FIG. 3B, a longitudinal sectional view of the junction device of FIG. 3A.

FIGS. 3A and 3B respectively illustrate a planar view of a junction device 1 according to an embodiment of the invention, seen from above and a longitudinal sectional view of this junction device 1.

Figure 6:
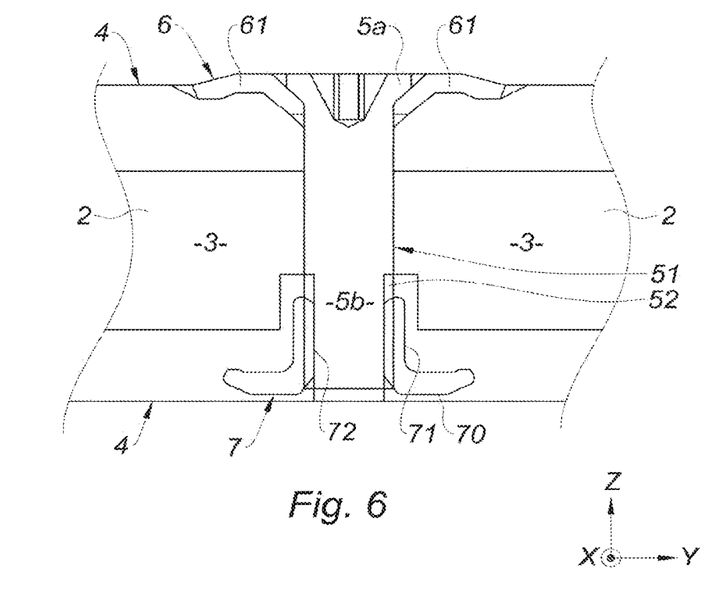

The junction device 1 comprises two junction plates 4 configured to be fastened together with the ends 3 of the conveyor belt 2 by fastening means 5 each comprising a head 5a and an anchoring section 5b forming an anchoring end opposite to the head 5a (see FIG. 6).

Each of the junction plates 4 of this junction device comprises first interfaces 6 to cooperate with the heads 5a of the fastening means 5 and second interfaces 7 to cooperate with the anchoring sections 5b of the fastening means 5.

The first and second distinct interfaces 6, 7 are arranged on each of the junction plates 4 so as to form a succession of patterns 8 which are repeated, and in that each pattern 8 has as many first interfaces 6 as second interfaces 7.

The junction plates 4 of the junction device 1 are laid out to mate with each other, that is to say that, in the assembled position of junction of said junction device 1:
each first interface 6 of a junction plate 4 is facing, vertically, a second interface 7 of the other junction plate 4 of said junction device 1; and vice versa:
each second interface 7 of a junction plate is facing, vertically, a first interface 6 of the other junction plate 4 of said junction device 1,
so as to be able to be fastened together by one of the fastening means 5 traversing the junction plates and one of the ends of the conveyor belt 2, each fastening means 5 cooperating with a couple of opposite first and second interfaces, that is to say aligned vertically in order to mate the two junction plates 4.

The pattern 8 is determined as a function of the position of the interfaces 6, 7. A junction device 1 provided with such junction plates 4 notably has the advantage of being able to have junction plates 4 being able to be used indiscriminately as upper junction plate 4 or as lower junction plate 4.

Indeed, the junction plates are generally cut from a continuous belt or portion of belt of several successive junction plates extending along a main direction of this belt or portion of belt, this main direction corresponding to the transversal sense Y of the conveyor belt. The junction plates 4 are obtained after cutting, from said belt or portion of belt thus manufactured, junction plates 4 according to predetermined dimensions. The dimension of the cut out of a predetermined length is chosen along the main direction of elongation of the belt or portion of belt so as to correspond to the width of the conveyor belt 1 of which the ends must be connected and joined, each of the junction plates 4 extending over the whole width of the conveyor belt 2.

Thanks to the succession of patterns 8 which are repeated along the junction plate 4 along its main direction of elongation, that is to say along the transversal axis Y of the conveyor belt 2, and to the fact that each pattern 8 has as many first interfaces 6 as second interfaces 7, it is then possible to form lower and upper junction plates 4 from the same belt or portion of belt then manufactured.

In this way, such a solution offers a reduction in the cost price, manufacturing price, storage price and distribution prices, and does so without adversely affecting in any way the quality of the product obtained.

Furthermore, it ensues from the application of such a solution that the extensibilities of the reinforcements integrated in the junction plates are identical, whether it is the lower or upper junction plate, since they are formed from the same belt or portion of belt manufactured.

Advantageously, the reinforcement (generally of textile type) is configured so as to have an extensibility comprised between 10% and 25%, preferably between 15% and 20%. Extensible character is taken to mean the elongation capacity of the reinforcement, that is to say that an extensibility comprised between 10 and 25% signifies that it is configured to withstand an elongation of at least 10% and of maximum 25%, and does so without breakage or damage.

This extensibility of the reinforcement, that is to say this longitudinal elastic elongation, also determines the extensibility of the junction plate itself given that the reinforcement has a lower extensibility than that of the flexible and elastic material in which it is embedded (vulcanised rubber, synthetic material such as polyurethane, etc.). Such an extensibility in the longitudinal sense ensures a good compromise of resistance to the stresses undergone both by the lower junction plate and by the upper junction plate.

In this embodiment (see FIGS. 3A and 3B), the first interfaces 6 comprise washers 61 forming added parts, said washers being maintained fixedly against the junction plate 4 by the pressure exerted by the head 5a of the associated fastening means 5 on said washer 61. This pressure leads to an elastic deformation of the material constituting the junction plate 4 such that the washer 61 comes to be housed in a recess of said junction plate in order that the washer 61 as well as the head 5a of the fastening means are both flush, in fastened position of the junction device, with the associated surface of the junction plate 4. This recess here created by simple elastic deformation may also be delimited during the manufacture of the junction plate 4 by a cavity delimited beforehand in said junction plate 4 around the orifice provided to be traversed by the fastening means 5, this cavity being laid out to receive and accommodate the washer 61, this for each of the first interfaces 6.

Furthermore, in this embodiment the second interfaces 7 comprise inserts 70, the inserts 70 of the second interfaces 7 being incorporated in the corresponding junction plate 4, and in particular embedded in the material constituting the junction plate 4, while being nevertheless projecting with respect to the junction plate towards the inside of the junction device 1 (that is to say towards the side where the junction belt in assembled position is situated). This projection of the insert 70 is also preferably embedded in the material constituting the junction plate 4.

In a more detailed manner:
the first interfaces 6 comprise pierced washers 61 comprising a cup capable of housing a head 5a of the fastening means 5; and
the second interfaces 7 comprise a cylindrical tubular part 71 of which an inner cylindrical surface 72 is capable of cooperating with an anchoring section 5b of the fastening means 5.

Furthermore, in this embodiment, the two junction plates are identical and each of said junction plates 4 comprises as many first interfaces 6 as second interfaces 7.

More specifically, in this embodiment illustrated in FIGS. 3A and 3B, each of the junction plates 4 comprises first and second longitudinally opposite wings 41, 42, configured to each cover a different end of the conveyor belt 2 on a same side since a junction plate 4 is arranged on a same side: one of the wings is configured to cover one side 3a of one of the ends of the conveyor belt 2 and the other of the wings is configured to cover the same side 3a of the other end 3 of the conveyor belt 2 to connect.

Each of said wings 41, 42 comprises a sub-pattern 8a, 8b defined by a geometric arrangement of the first and/or second interfaces 6, 7, the sub-pattern 8a of one 41 of said wings being complementary to the sub-pattern 8b of the other 42 of said wings.

The term "complementary" is taken to mean that the arrangements of the interfaces 6, 7 defining each of the two sub-patterns 8a, 8b are symmetrical with respect to a median axis Δ' of the junction plate 4 (see FIG. 3A) separating said wings 41, 42 but that the position of a first interface 6 on a wing 41 corresponds to the position of a second interface 7 on the other wing 42, and vice versa.

The embodiment illustrated in FIGS. 3A and 3B is a simple example to enable correct understanding, each wing 41, 42 comprising a single row of interfaces:
one 41 of the wings has a row of first interfaces 6 extending along the main direction of elongation of the junction plate 4, namely along the transversal sense Y of the junction device 1, a first interface 6 forming on its own a sub-pattern 8a;
the other 42 of the wings has a row of second interfaces 7 extending along the main direction of elongation of the junction plate 4, namely along the transversal sense Y of the junction device 1, a second interface 7 forming on its own a sub-pattern 8b.

A pattern 8 in this embodiment is formed by the sub-patterns 8a and 8b aligned along the longitudinal sense X. These two sub-patterns are complementary and a second junction plate 4, identical to the first and having the same pattern 8, may be superimposed thereon in order to mate with one another.

In this embodiment, to do so it suffices that the upper junction plate 4 is oriented in a sense opposite to that of the lower junction plate 4 such that the wing 41 of one of the junction plates 4 is facing the other wing 42 of the other junction plate 4.

In other words, in this embodiment, there exists a central symmetry between the two junction plates 4 of the junction device 1 with respect to a central longitudinal axis Δ (see FIG. 3B), this in assembled junction position.

Figure 7A:
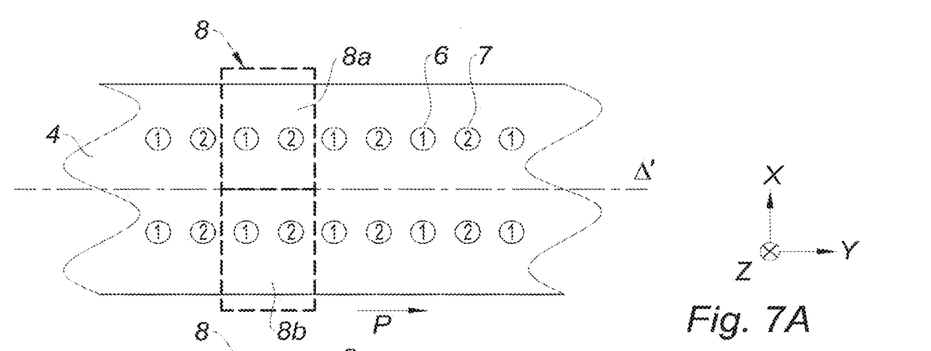

In a particular alternative, illustrated for example in FIG. 7A, each of the rows of interfaces may be composed of a succession of alternating first and second interfaces 6, 7 along the transversal sense Y of the junction device 1, identical interfaces being aligned along the longitudinal sense X of the junction device 1, a pattern 8 then comprises:
a first sub-pattern 8a formed by a portion of row having a first then a second interface 6, 7, and
a second sub-pattern 8b, formed by a portion of row having respectively a first then a second interface 6, 7, the second pattern 8b being here symmetrical to the first pattern 8a with respect to a median axis Δ' of the junction plate 4 (see FIG. 7A), and the first and second interfaces 6, 7 being arranged so as to form an alternating succession of a first and a second sub-pattern 8a, 8b which are repeated alternately and successively.

In this configuration, a junction plate 4 is capable of being superimposed with another junction plate having the same characteristics in order to form, together, a junction device 1.

In this case, the patterns 8 of the two junction plates 4 of the junction device are offset by a predetermined pitch p (see FIG. 7A) in order to be complementary. In this example, a pitch corresponds to a half-pattern along the transversal sense Y of the junction device 1 so that each first interface of a junction plate 4 is arranged vertically in line with a second interface of the other junction plate of the corresponding junctioning device 1.

The fastening means 5 are not illustrated in FIGS. 3A and 3B: said fastening means 5 typically comprise screws 51 having a head 5a and an anchoring section 5b provided with a threading 52. They are illustrated in detail in FIG. 6.

Figure 4A:
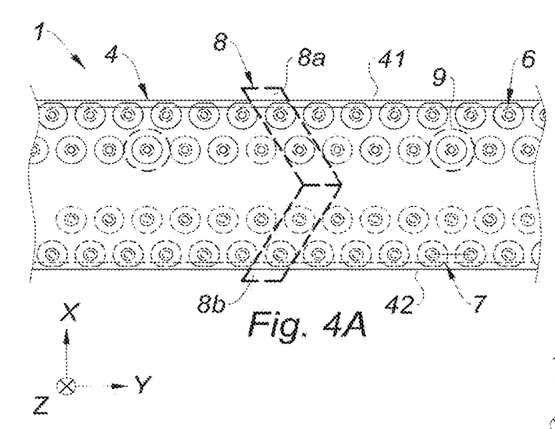
FIG. 4A, a planar view of a junction device according to another embodiment of the invention, seen from above.
Figure 4B:
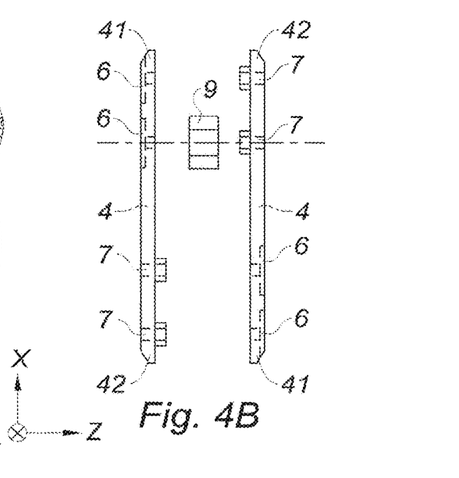
FIG. 4B, a longitudinal sectional view of the junction device of FIG. 4A.

FIGS. 4A and 4B illustrate respectively a planar view of a junction device 1 according to an embodiment of the invention, seen from above and a longitudinal sectional view of this junction device 1.

This embodiment differs from the first embodiment illustrated in FIGS. 3A and 3B essentially in that each of the wings 41, 42 comprises two rows of interfaces.

More specifically, each wing 41, 42 of a junction plate 4 comprises two rows of interfaces:
one 41 of the wings has two substantially parallel rows of first interfaces 6 extending along the main direction of elongation of the junction plate 4, namely along the transversal sense Y of the junction device 1, two neighbouring first interfaces 6 longitudinally forming together a sub-pattern 8*a*;

the other 42 of the wings has two substantially parallel rows of second interfaces 7 extending along the main direction of elongation of the junction plate 4, namely along the transversal sense Y of the junction device 1, two longitudinally neighbouring second interfaces 7 forming together a sub-pattern 8*b*.

The two rows of each of the wings are arranged staggered such that the patterns 8 are not necessarily formed by a rectangular portion of the junction plate 4, as in FIGS. 3A and 3B.

Figure 5:
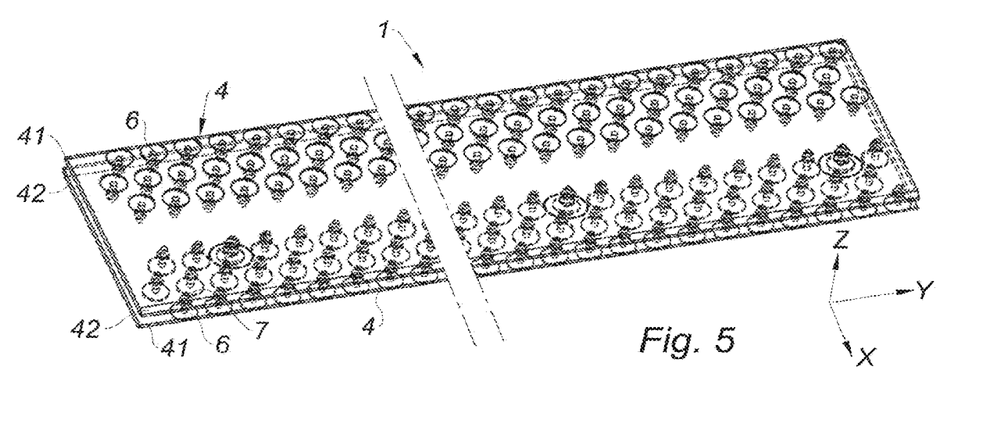
FIG. 5, a perspective view of a junction device according to another embodiment of the invention, FIG. 6, a sectional view of a fastening means according to an embodiment, FIGS. 7A, 7B, 7c and 7d, schematic examples of patterns formed by the first and second interfaces according to different embodiments.

FIG. 5 illustrates a perspective view of a junction device 1 according to another embodiment of the invention.

This embodiment differs from the first embodiment illustrated in FIGS. 3A and 3B essentially in that each of the wings comprises three rows of interfaces.

More specifically, each wing 41, 42 of a junction plate 4 comprises three rows of interfaces:

one 41 of the wings has three rows of first interfaces 6 extending along the main direction of elongation of the junction plate 4, namely along the transversal sense Y of the junction device 1, three neighbouring first interfaces 6 longitudinally and substantially aligned forming together a sub-pattern 8*a*;

the other 42 of the wings has three rows of second interfaces 7 extending along the main direction of elongation of the junction plate 4, namely along the transversal sense Y of the junction device 1, three neighbouring second interfaces 7 longitudinally and substantially aligned forming together a sub-pattern 8*b*.

The three rows of each of the wings are arranged staggered, so as to spread out in a homogenous manner the forces transmitted by the fastening means to the junction plates 4 in junction position.

FIG. 6 is a section along a vertical plane of an example of fastening means 5 according to the present patent application comprising a screw 51 forming an assembly screwed by the fastening means 5 comprising the upper junction plate 4, an end 3 of conveyor belt 2 and the lower junction plate 4.

The first interface 6 laid out to receive the heads 5*a* of screws 51 has a washer 61 pierced by an orifice and comprising a cup around this orifice capable of housing the heads 5*a* of the screws 5 intended to pass into said orifice of the pierced washers 61.

The second interface 7 comprises an insert 70 comprising a tubular part 71 of which an inner cylindrical surface is tapped and is capable of receiving a barrel screw threading 51 forming the anchoring section 5*b* of the screw 51, in order to be screwed thereto. The tubular part 71 of the insert 70 projects with respect to the inner surface of the lower junction plate 4 of the junction device 1.

FIGS. 7A, 7B, 7C and 7D illustrate schematic examples of patterns formed by the first and second interfaces 6, 7 according to different embodiments and of which the pattern is configured so that a succession of such patterns on a junction plate 4 can mate with a succession of this same pattern of another junction plate 4 which could be arranged facing the first.

It will be noted that in these FIGS. 7A to 7D, the first and second interfaces 6, 7 are shown schematically by the ringed numbers 1 and 2, respectively, to make them easier to understand.

Figure 7B:
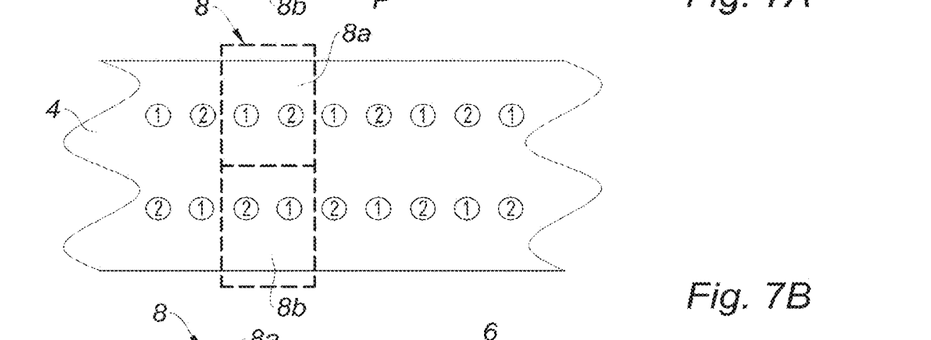
Figure 7C:
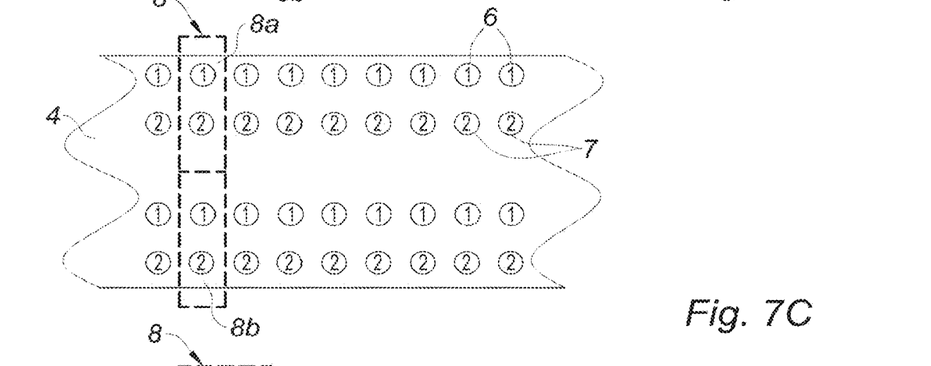
Figure 7D:
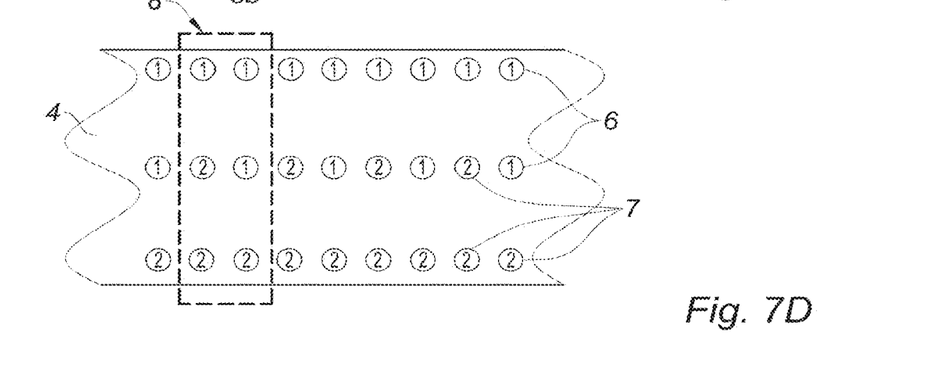

It will also be noted that between the two wings, along the median axis, a row of first and second interfaces 6, 7 may be interposed, as is illustrated in greater detail in the example of FIG. 7D.

It will however be noted that when the median axis is free of interfaces, that is to say when it does not have any interface in this zone, this defines a median zone without interface between the two wings which improves the elasticity of the junction device at this spot and improves its mechanical strength. Indeed, a row of interfaces along the median axis could favour to a lesser extent an incipient breakage.

In such a configuration, a junction plate 4 is capable of being superimposed with another junction plate having the same characteristics in order to form, together, a junction device 1. In this embodiment, to do so it suffices that the upper junction plate 4 is oriented in the opposite sense to that of the lower junction plate such that the wing 41 of one of the junction plates 4 is facing the other wing 42 of the other junction plate 4 but also that the two junction plates 4 of the junction device are offset by a predetermined pitch p in order to be complementary. In this example, a pitch corresponds to a half-pattern along the transversal sense Y of the junction device 1 so that each first interface 6 of a junction plate 4 is arranged vertically in line with a second interface 7 of the other junction plate 4 of the corresponding junctioning device 1.

Furthermore, FIG. 7B illustrates an exemplary embodiment which differs substantially from that of FIG. 7A in that the second pattern 8*b* is here complementary and no longer symmetrical to the first pattern 8*a* with respect to the median axis Δ' of the junction plate 4.

The invention is described above as an example. It is understood that those skilled in the art are able to carry out different alternative embodiments of the invention without however going beyond the scope of the invention.

For example, given the distances for transporting different materials or different products according to the usages in quarries or other places of use, a same band conveyor or conveyor may be formed by the bringing together or the junction of several conveyor belts connected together by a junction device such as described above.

Furthermore, it is understood that fastening means other than screws may be used while ensuring the same function.

The number of rows of interfaces may also vary as a function of the desired use.

Finally, it is understood that the patterns may vary. Generally speaking, the junction plates 4 are obtained from a same pattern, whatever it is, and configured so that said junction plates are capable of mating with each other.

The invention claimed is:

1. A junction plate for a junction device of conveyor belt intended to connect two ends of at least one conveyor belt, the junction device being of a type comprising at least two junction plates fastened together with the ends of the conveyor belt by fastening means each comprising a head and an anchoring section, wherein the junction plate comprises first interfaces to cooperate with the heads of the fastening means and second interfaces to cooperate with the anchoring sections of the fastening means, the second interfaces being distinct from the first interfaces and comprising inserts incorporated at least in part in the junction plate, the first and second interfaces being arranged so as to form a succession of patterns which are repeated, and each pattern has as many first interfaces as second interfaces.

2. The junction plate according to claim 1, wherein the first interfaces comprise pierced washers comprising a cup capable of housing a head of the fastening means.

3. The junction plate according to claim 1, wherein the second interfaces comprise a cylindrical tubular part of which an inner cylindrical surface is capable of cooperating with an anchoring section of the fastening means.

4. A junction plate for a junction device of conveyor belt intended to connect two ends of at least one conveyor belt, the junction device being of a type comprising at least two junction plates fastened together with the ends of the conveyor belt by fastening means of screw type each comprising a head and an anchoring section provided with a threading, wherein the junction plate comprises first interfaces to cooperate with the heads of the fastening means and second interfaces to cooperate with the anchoring sections of the fastening means, the first and second interfaces being arranged so as to form a succession of patterns which are repeated, and each pattern has as many first interfaces as second interfaces.

5. A junction device for conveyor belt, intended to connect two ends of at least one conveyor belt, the junction device comprising at least two junction plates configured to each cover a distinct side of the ends of the conveyor belt so that said conveyor belt is arranged between the two junction plates, the junction plates being fastened together by fastening means laid out to traverse respectively a junction plate, one of the ends of the conveyor belt then the other junction plate, the fastening means each comprising a head and an anchoring section, wherein the junction plates comprise first interfaces to cooperate with the heads of the fastening means and second interfaces to cooperate with the anchoring sections of the fastening means, the second interfaces being distinct from the first interfaces and comprising inserts incorporated at least in part in the junction plate, the first and second interfaces being arranged so as to form a succession of patterns which are repeated, and the junction plates are laid out to mate with each other.

6. The junction device according to claim 5, wherein each of the junction plates comprises as many first interfaces as second interfaces.

7. The junction device according to claim 6, wherein each of the junction plates comprises first and second opposite wings configured to each cover a distinct end of the conveyor belt of a same side, the first wing uniquely comprising first interfaces and the second wing uniquely comprising second interfaces.

8. The junction device according to claim 5, wherein the junction plates are identical.

9. The junction device according to claim 5, wherein the patterns of the two junction plates are offset by a predetermined pitch.

10. A method for manufacturing the junction plate according to claim 1, the method comprising:
manufacturing a continuous succession of junction plates in the form of belt; and
cutting, from said belt thus manufactured, junction plates according to predetermined dimensions.

* * * * *